C. W. ARMBRUST.
BRAKE SHOE.
APPLICATION FILED MAY 26, 1916.
1,239,448.
Patented Sept. 11, 1917.
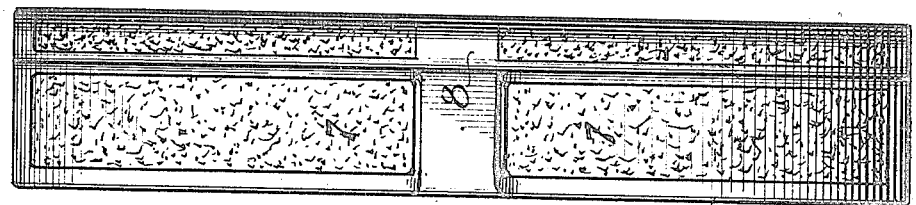
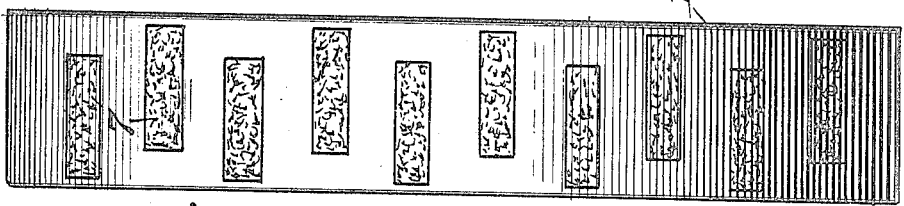
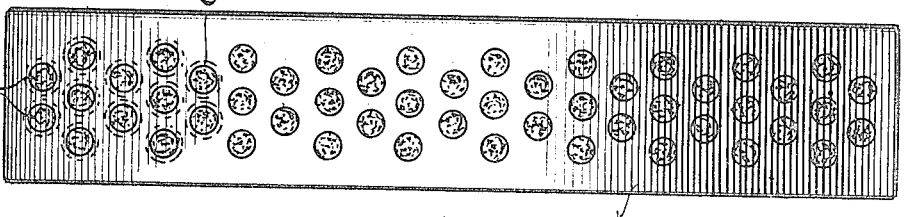
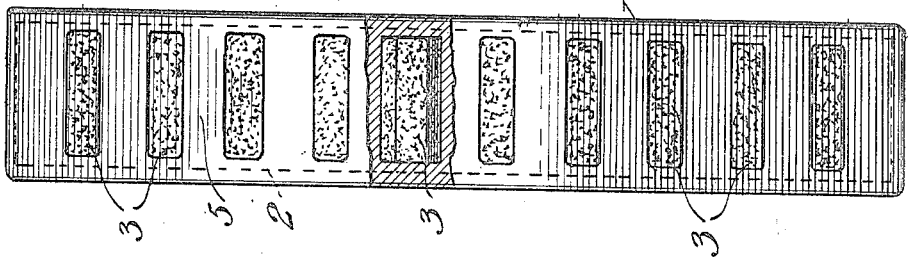
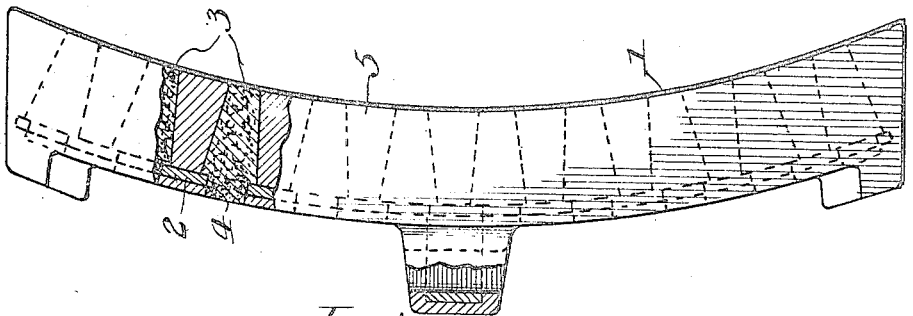
Inventor
Charles W. Armbrust

UNITED STATES PATENT OFFICE.

CHARLES W. ARMBRUST, OF CHICAGO, ILLINOIS, ASSIGNOR, BY MESNE ASSIGNMENTS, TO THE AMERICAN BRAKE SHOE & FOUNDRY COMPANY, OF WILMINGTON, DELAWARE, A CORPORATION OF DELAWARE.

BRAKE-SHOE.

1,239,448.

Specification of Letters Patent.

Patented Sept. 11, 1917.

Application filed May 26, 1916. Serial No. 99,938.

*To all whom it may concern:*

Be it known that I, CHARLES W. ARMBRUST, a citizen of the United States, residing at Chicago, in the county of Cook and State of Illinois, have invented a certain new and useful Improvement in Brake-Shoes, of which the following is a full, clear, concise, and exact description, reference being had to the accompanying drawings, forming a part of this specification.

My invention relates to brake shoes and has for its object the provision of an improved brake shoe with a reduced area of contact, this reduced area being secured by provision of recesses or holes extending forwardly from the back of the shoe, which holes or recesses are suitably filled with a lubricant or filler.

In a companion case Serial No. 99,937, filed May 26, 1916, I set forth a brake shoe provided with recesses extending backwardly from its front face. In this present application I set forth a similar brake shoe provided with suitable filler for the recesses. To illustrate the principle involved in this and my said co-pending application, it is pointed out that brake shoes are used to retard the motion of vehicles, and the retarding effect is due to the friction between the applied brake shoes and the wheels. For any given case, the amount of friction the retarding effect produces will depend on the materials of which the shoes are made, the weight of the car, and the pressure of the shoe against the wheel. According to the laws of friction we find that friction is directly proportional to the weight or force applied, but is independent of the surfaces in contact, the total friction remaining the same (within practical limits). Furthermore, the coefficient of friction varies with the speed and length of time the running surfaces are in contact. The coefficient of friction is used to figure the friction between two surfaces in sliding contact, and is determined by the nature of the materials in contact.

Rotation of the wheels in the case of a moving train is caused by the adhesion of tires or rims to the rails. Each point of the tire surface of a rotating wheel moves around at the same rate as the train moves forward, but when it comes in contact with the rail it is momentarily at rest in relation to the forward movement of the train. If pressure be applied to the shoe the wheel continues to revolve at a rate corresponding to the speed of the train, but the rotary motion is kept up with more difficulty under pressure than before so that if tractive force is not supplied the train will slow down and finally stop. If the pressure on the shoe is gradually increased the friction between wheel and shoe becomes greater and greater until it first equals and then exceeds the adhesion between the tires and the rail.

As stated above, the tire in contact with the rail being at rest momentarily with reference to the forward motion of the train, the adhesion must be caused by friction. When the friction of the shoe equals the adhesive force to the rails, the wheels skid along the rails and the resistance to its motion is equal to the frictional resistance to the sliding motion of the wheels along the rails. Thus it is seen that there are two cases.

First: The retarding force of the brake shoe against the wheel which is measured by the coefficient of friction between the shoe and wheel, by the pressure exerted against the shoe.

Second: The skidding of the wheels along the rail which force is measured by the coefficient of friction between rail and wheel by the weight on the wheel.

From the foregoing fact we see the rail acts in every sense the same as a brake shoe and bears out the second law of friction, that "friction is independent of the extent of the surfaces in sliding contact." In any given case the retarding power is limited to the adhesive force of the wheel to the rail, in which case the extent of the surfaces in sliding contact is practically only a line the width of the rail.

I find that in accordance with the above facts I am enabled to construct a brake shoe of which the area of the material pressing against the wheel is largely reduced without sacrificing any of the frictional value, and yet insuring longer life of the shoes.

In one form of the invention which will be described more in detail later I use a brake shoe whose outline is the same in size as that of the standard brake shoes. I however provide holes in this brake shoe to reduce the area of contact, thus saving a large amount of material, making the brake shoe cheaper. Furthermore the provision of these holes permits me to have chilled edges around them and thus to increase the life of the shoe over and beyond what is now obtainable.

However, as stated, I avail myself of the recesses thus provided to incorporate with the shoe also a suitable filler which may be used for lubricating, cleaning, cooling, trimming, or other purposes, as may be desired. Brake shoes heretofore have had inserts of various kinds made of various metals and materials different from the metal of the shoe body, in wedged and various shaped sections placed in the mold and cast in the shoe body. These have invariably been cast in the face of the shoe body separately. Wedge shaped holes may have been cast in the face of a shoe by the use of separate cores or by the pattern with the widest part of said holes in the face and tapering backwardly, and holes with straight edges may have been likewise cast into a brake shoe. The holes in this structure however are formed by and in the pattern, and they are formed by and in the pattern extending from the back to the face of the shoe body, and they are formed by and in the pattern from the back to the face of the shoe body in wedge form with the large end of the wedge at the back of the shoe body and gradually tapering toward the face of the shoe body, in the shoe body. Also in this structure the lubricating and other kinds of fillers are forced into the holes from the back of the shoe. This structure also has a steel back coöperating with said holes to keep the filler in said holes from coming out at the back of the shoe, the tapered hole preventing the filler from being forced out of the face of the shoe.

I will explain various forms which my invention may take more in detail by referring to the accompanying drawing, in which—

Figure 1 is a side view partly in section of a brake shoe constructed in accordance with my invention; Fig. 2 is a front face view thereof;

Figs. 3 and 4 are views similar to Fig. 2 of modified forms of the invention, and Fig. 5 is a view similar to Fig. 2 showing the recesses very much enlarged and showing the shoe as provided with a recessed extension adapted to coöperate with the flange of the wheel.

Referring more particularly to Figs. 1 and 2, I show a brake shoe having the body portion 1 and the back portion 2 cast integrally on a steel back 9. The brake shoe body is provided with recesses or holes 3, 3 which extend entirely through the shoe and which gradually taper from the rear of the shoe toward the front face. The back portion 2 is also provided with openings 4, but preferably smaller than the rear openings of the holes 3. These holes are then suitably filled with a filler 5 which may be graphite or similar material, wood, sawdust or any lubricating or frictional or cooling or trimming or cutting material, depending on the purposes for which the material is to be used. As stated, the reduction in the area of the brake shoe does not in any way militate against its frictional characteristics. The filler, however, may be used for a number of purposes as already stated.

In Fig. 3, I show a modified form of the device in which holes 6, 6 are used similar to the holes 3 except that they are round.

In Fig. 4 I provide a back having the staggered and diagonally placed holes 7, 7.

In Fig. 5 I show the back as being provided with a flanged portion 8 to show the adaptation of a shoe having provision both for the tread and the flange of the wheel.

These modifications are shown merely to indicate that I am not dependent upon the outline of the holes to secure the desired effects within practical limits.

From what has been described the nature of my invention will be readily clear to those skilled in the art. Having however thus described several forms which my invention may take, what I claim as new and desire to secure by Letters Patent is:

1. A brake shoe consisting of a shoe body and a metal backing plate, said shoe body having a plurality of wedge shaped holes extending from its back to its face, said holes being larger at the back of said shoe than at its face, said backing plate having holes coöperating with the holes in the shoe body, said holes in said back being smaller than the holes in said shoe body.

2. A brake shoe having a plurality of wedge shaped holes extending clear through said shoe and tapering from the back to the face of said shoe, said holes being filled with a substance, said substance being introduced from the rear of the shoe.

3. A brake shoe consisting of a shoe body, and a metal backing plate, said shoe body having a plurality of wedge shaped holes extending from its back to its face, said holes being larger at the back of said shoe than at its face, said backing plate having holes coöperating with the holes of said shoe body.

4. A brake shoe having a plurality of holes therein tapering from its face to its back, a filler in said holes, and shoulders projecting into the holes at the back of the shoe to retain the filler in place.

5. A brake shoe having a plurality of holes therein tapering from its face to its back, a reinforcing plate embedded in the shoe at the back thereof, said plate and the back portion of the body of the shoe behind the plate having registering holes therein registering with the holes in front of said plate but of less diameter to form inwardly directed shoulders, and a filler in said holes.

In witness whereof, I hereunto subscribe my name this 23rd day of May, A. D. 1916.

CHARLES W. ARMBRUST.

Witnesses:
    A. L. JONES,
    HAZEL A. JONES.